Nov. 11, 1930. J. A. SEXAUER 1,781,129
WASHER
Filed June 6, 1928
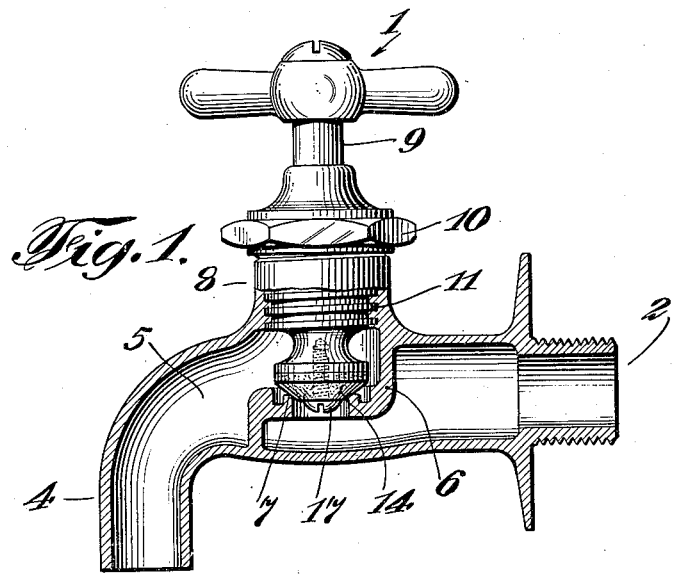
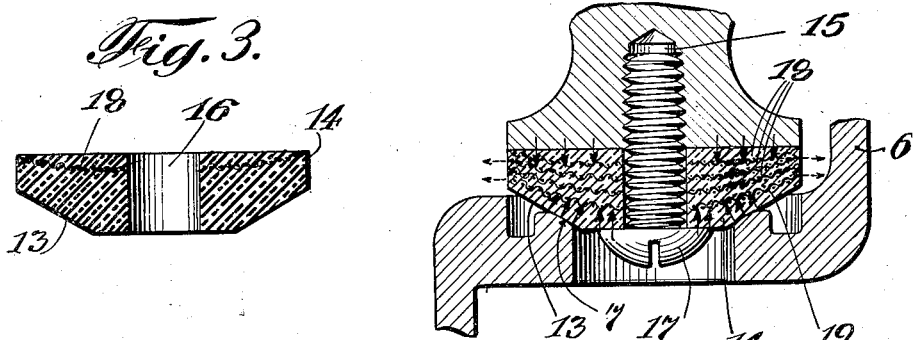
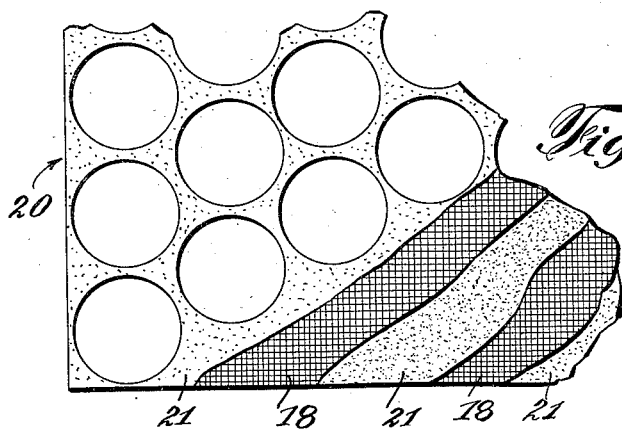
INVENTOR
John A. Sexauer
BY
his ATTORNEY Patented Nov. 11, 1930

1,781,129

UNITED STATES PATENT OFFICE

JOHN A. SEXAUER, OF NEW YORK, N. Y.

WASHER

Application filed June 6, 1928. Serial No. 283,346.

The present invention relates to valves and more particularly to washers for valves in compression faucets and the like.

Washers are relatively inexpensive when compared to the cost of the faucets or other devices in which they are used but they represent the most vulnerable part of such devices since they must withstand substantially all the wear and must be subjected to various pressures and temperatures. A slight leak impairs the entire valve. The housewife or other user does not have the necessary wrenches or other facilities for shutting off the water supply and putting a new washer in the faucet. In most instances, a plumber is called in and the charge for his labor is many times the cost of the washer. Frequently the consumer considers the faucet worn out and purchases a new one. In other cases, valves with partially worn, defective washers are permitted to leak which causes the faucets to drip, making a disagreeable noise in addition to wasting water continuously.

In view of their importance, considerable effort has been made to perfect valves particularly the washers used therein. Several types of washers have been developed in an effort to minimize or eliminate the difficulties. Fibre washers are too hard to function properly and small particles, such as grains of sand, are likely to damage the valve seat if trapped beneath the washer. Leather washers when subjected to high temperatures such as boiling water or steam, decompose and are, therefore, undesirable.

Rubber washers are subject to the objection that relatively soft rubber loses its shape and wears rapidly. Hard rubber, on the other hand, is brittle and therefore breaks under the severe strains to which it is subjected. The washer must be first attached to the end of the valve stem and this is usually done by means of a screw. If the screw is applied with sufficient force to hold the washer tightly in place, there is considerable tendency for the washer to break, if brittle, and to lose its shape, if soft. If the washer survives the screw pressure, it must later be subjected to the high torsional and compressional forces applied by means of the screw leverage utilized in closing the valve.

The present invention aims to overcome the above difficulties by the utilization of an improved rubber washer for attachment to the valve stems of faucets and the like adapted to withstand the wear occasioned by the combined torsional and compression stresses to which it is subjected, and to minimize the cost of such washers by the method of manufacture.

An object of the invention is to provide a rubber washer adapted to hold its shape under customary pressures and also adapted to resist successively strains tending to break it.

Another object of the invention is to minimize the necessary repairs for faucets and the like by increasing substantially the useful period of valves therein.

A further object of the invention is to provide a washer for use in valves which is simple in construction, inexpensive to manufacture and fully capable of withstanding the rough usage to which it may be subjected.

A further object of the invention is to provide an improved washer which may be manufactured at a low cost.

Other and further objects of the invention will be obvious upon an understanding of the illustrated embodiment about to be described or will be indicated in the appended claims, and various advantages not referred to herein will occur to one skilled in the art upon employment of the invention in practice.

A preferred embodiment of the invention has been chosen for purpose of illustration and description and is shown in the accompanying drawings, wherein Fig. 1 is a sectional view of a faucet partly in elevation illustrating one embodiment of the invention.

Fig. 2 is a fragmentary sectional view showing the valve in seated position and indicating the internal forces in the washer;

Fig. 3 is a detailed sectional view of a washer illustrating the use of a single layer of fabric therein; and Fig. 4 is a plan view of a portion of sheet material from which washers have been punched, preliminary to vulcanization.

Referring to the drawings, there is shown a faucet 1 having an inlet end 2 threaded for attachment to a suitable tap and having its other end bent downwardly to form an outlet 4. A conduit 5 is provided therein having a dividing wall 6 with a valve seat 7 in the horizontal portion thereof. Extending above the valve seat is a housing 8 for the valve operating mechanism which may comprise a valve stem 9 extending through the nut 10 having suitable packing therein not shown. A threaded enlargement 11 on the valve stem cooperates with suitable screw threads on the interior of the housing 8 so that when the valve stem 9 is turned, the closing member is moved upwardly or downwardly depending upon the direction in which the stem is turned.

The closing member comprises the end of the valve stem and a washer 14, seated thereon and retained in position by a suitable screw 17 extending through the aperture 16 of the washer and threaded into the aperture 15 in the valve stem. The washer is preferably formed of rubber which is vulcanized to a point where it is quite hard, in fact sufficiently hard that it is inclined to be brittle. One or more layers of fabric 18 are embedded in the washer. These may be made of cloth of substantially the same size as the washer with an aperture in the center registering with the aperture 16 in the washer. These pieces of cloth or fabric are embedded in the rubber while in its unvulcanized state after which it is shaped and vulcanized to the proper degree. Preferably the washer has a flat upper surface and a cylindrical body part with the lower edge bevelled to form a conical seat engaging surface 13 which fits into the valve seat and is subjected to vertical and horizontal forces.

The bottom layer 19 of the fabric as shown in the completed washer is preferably spaced a relatively large distance from the bottom of the washer. The purpose of this is to permit substantial wear at this point without engagement of the metal valve seat 7 with the fabric. Such engagement would tend to destroy the fabric and the wear on the valve at this point would be accelerated rather than retarded. In the illustrated embodiments, four pieces of fabric are shown spaced substantially equal distances apart; the top layer is preferably in close proximity to the upper surface of the washer. The distance between the layers is greatest at the center of the washer and decreases as the periphery is approached. In this way the layers of fabric conform to the shape of the washer.

In attaching a washer to the valve stem of the faucet the screw 17 is inserted through the aperture in the washer and threaded in the aperture 15 of the valve stem. Plumbers utilize screws of different lengths for this purpose, and hence there is nothing to limit the pressure applied by means of the screw except the strength of the plumber. As a result sufficient pressure is applied at the center of the washer to create the tendency in the washer to dish on its seat. This creates internal stresses tending to break the washer and frequently does break the usual forms.

By having a layer of fabric in close proximity to the upper surface of the washer where the stresses are greatest, the fabric takes up these stresses and not only prevents the washer from breaking but also holds it in its proper shape. The other layers of fabric cooperate with the upper layer to prevent any lateral expansion of the washer.

After the washer is attached to the valve stem it must then withstand the torsional and compressional stresses created by the pressure applied for firmly seating it. These pressures are created by rotation of the stem 9 and very severe strains are put upon the washer due to the fact that it must slip on the valve seat under seating pressures. There is a gripping action between the seat and the valve under the heavy pressures. Frequently grains of sand or other small particles are caught between the two and these tend to grind the washer. In other cases, the seat may be rough. In Fig. 2 the compressional forces in the valve when seated, are indicated roughly by the arrows; the fully lined arrows indicating the pressure applied by the screw and the valve seat. The dotted arrows indicate the resulting internal stresses tending to deform and break the washer. It will be noted that these, for the most part, are in directions parallel to the plane of the layers of fabric. The strains are therefore taken up by the fabric. The bottom layer of fabric is spaced substantially from the bottom of the washer which permits substantial wear before the valve seat approaches the first layer of fabric; this prolongs the life of the washer.

In Fig. 3, a washer is shown having a single layer of fabric preferably positioned adjacent the upper surface thereof. When the washer engages the seat of the valve, as shown in Fig. 2, there is a tendency for the portion of the washer above the conical seat to spread. The layer of fabric above the conical part prevents spreading and strengthens the washer substantially. It will be understood that both the washer shown in Fig. 2 and that shown in Fig. 3 are illustrative and that any number of layers of fabric may be utilized in the washers without departing from the scope of the invention, the form shown being illustrative of the preferred embodiment and not of all embodiments.

By utilizing fabric for resisting the internal stresses it is possible to utilize a rubber which is much harder and more brittle than would otherwise be feasible. Such rubber will wear much longer than rubber which is sufficiently pliable to withstand the stresses without additional support.

The preferred method of making the washer is to build up a sheet 20 having successive layers of rubber 21 of suitable composition with one or more layers of fabric 18 intermediate the layers of rubber as shown in Fig. 4. When the combined layers of rubber and fabric have been formed into an integral sheet of material, the sheet may be subjected to a punching operation in which plastic forms are punched from the sheet and placed in suitable molds for vulcanization. While the temperature and time of vulcanizing may be varied, excellent results can be attained by subjecting the plastic rubber to a temperature of 320 degrees for a period of twelve minutes. This gives a degree of hardness which will effectively resist the severe wear in faucets.

By utilizing the method described above, a sheet or blank may be readily prepared from which a number of mold forms may be punched simultaneously. The necessity for handling the small pieces of fabric in the respective washers is rendered unnecessary. This minimizes the labor required and also affords uniformity in the individual washers. When the unvulcanized blanks are pressed into the molds which have a circumference slightly greater than the circumference of the blanks, the rubber expands about the peripheries of the pieces of fabric and completely envelopes them giving a smooth external finish with the edges of the fabric concealed.

It will be seen that faucets provided with washers in accordance with the present invention will have a longer life and require less repair than those heretofore. The washer has a maximum resistance to stresses tending to break the washer and yet is sufficiently hard to give it the wear-resisting properties necessary for long use. The improved method of manufacture minimizes the labor required and reduces the cost of manufacture so that the resulting washers are relatively inexpensive. The increased cost, if any, over the cost of ordinary washers, is insignificant as compared with the labor charge for replacement.

As various changes may be made in size, shape and character of the above embodiment without departing from the spirit of the invention, it is to be understood that all matter herein is to be interpreted as illustrative and not in a limiting sense.

Having thus described my invention, I claim:

1. As an article of manufacture, a washer for attachment to valve stems and the like, said washer being made of rubber and having a flexible layer of fabric embedded therein adjacent the upper surface thereof and spaced a substantially greater distance from the bottom surface, to reinforce and strengthen the washer without materially decreasing the thickness of the wear resisting material at the bottom of the washer.

2. In a device of the class described, the combination of a valve seat, a valve stem, and a washer mounted on said valve stem, provided with a conical surface for engagement with the valve seat, said washer having fabric members embedded therein to prevent it from expanding when pressure is exerted thereon, the bottom fabric member being spaced a substantial distance from the bottom of the washer.

3. A washer for attachment to valve stems and the like, said washer being made of rubber and having an annular, bevelled surface for engagement with the valve seat, and having a layer of fabric embedded therein, said layer of fabric being above the level of the upper edge of said bevelled portion.

4. A washer for attachment to valve stems in water faucets and the like, said washer being made of rubber and having a flexible unstiffened disc of fabric therein substantially the size of the washer to increase the strength thereof without increasing its rigidity.

5. A washer for attachment to valve stems in water faucets and the like comprising vulcanized rubber free from semi-rigid substances and having a flexible disc of fabric therein positioned intermediate the top and bottom surfaces of the washer to minimize lateral expansion thereof.

6. A washer for attachment to the bottom of valve stems in water faucets and the like made of rubber vulcanized sufficiently hard to be somewhat brittle and having layers of fabric therein adapted to resist torsion and compression forces exerted thereon, said washer having an annular bevelled surface for engaging the inner edge of the valve seat to close said valve.

7. A washer for attachment to the bottom of valve stems in water faucets and the like, said washer being made of rubber and having a plurality of layers of fabric to minimize the displacement thereof under vertical pressure, the lower side of said washer being bevelled to engage the inner side of the valve seat.

8. A washer for attachment to the bottom of valve stems in water faucets and the like, said washer being made of rubber and having a layer of fabric embedded in and spaced slightly from the top of the washer and spaced a relatively greater distance from the bottom than from the top thereof.

9. A washer for attachment to valve stems and the like, said washer having an annular bevelled surface for engagement with the valve seat and having layers of fabric embedded therein, the bottom layer being spaced a relatively large distance from the bottom of the washer.

10. A washer for attachment to valve stems and the like, said washer having layers of fabric embedded therein, the peripheral portions of said layers being in closer proximity to each other than the central portions thereof.

JOHN A. SEXAUER.